(12) United States Patent
Xie et al.

(10) Patent No.: US 8,711,141 B2
(45) Date of Patent: Apr. 29, 2014

(54) 3D IMAGE GENERATING METHOD, 3D ANIMATION GENERATING METHOD, AND BOTH 3D IMAGE GENERATING MODULE AND 3D ANIMATION GENERATING MODULE THEREOF

(75) Inventors: YanTao Xie, Hangzhou (CN); Jian-Hua Lin, Hangzhou (CN); Jin Wang, Hangzhou (CN)

(73) Assignee: ArcSoft Hangzhou Co., Ltd., Hangzhou, Zhejiang Province (CN)

( * ) Notice: Subject to any disclaimer, the term of this patent is extended or adjusted under 35 U.S.C. 154(b) by 262 days.

(21) Appl. No.: 13/219,709

(22) Filed: Aug. 28, 2011

(65) Prior Publication Data

US 2013/0050185 A1 Feb. 28, 2013

(51) Int. Cl.
*G06T 15/00* (2011.01)
*G06K 9/00* (2006.01)
*G06K 9/46* (2006.01)
*G06K 9/34* (2006.01)
*G06T 15/40* (2011.01)
*H04N 13/00* (2006.01)

(52) U.S. Cl.
USPC ...... 345/419; 382/154; 382/240.08; 382/180; 382/103; 348/42; 345/422

(58) Field of Classification Search
USPC .......................................................... 345/419
See application file for complete search history.

(56) References Cited

U.S. PATENT DOCUMENTS

| 2002/0186216 A1* | 12/2002 | Baumberg et al. ............ 345/422 |
| 2008/0170787 A1* | 7/2008 | Cheng et al. ................. 382/180 |
| 2009/0116732 A1* | 5/2009 | Zhou et al. .................... 382/154 |
| 2010/0194856 A1* | 8/2010 | Varekamp ........................ 348/42 |
| 2011/0018868 A1* | 1/2011 | Inoue et al. ................... 345/419 |
| 2011/0096832 A1* | 4/2011 | Zhang et al. ............. 375/240.08 |
| 2011/0293137 A1* | 12/2011 | Gurman et al. ............... 382/103 |

* cited by examiner

*Primary Examiner* — David Zarka
*Assistant Examiner* — Andrew J Gill
(74) *Attorney, Agent, or Firm* — Winston Hsu; Scott Margo (57) ABSTRACT

For transforming a 2D image into a 3D image, or for transforming a 2D animation into a 3D animation, depths of the 2D image or the 2D animation are required and corrected by enhancing edges. Moreover, a 3D model is generated according to a corrected 2D depth map, and the 3D model is then filmed by virtual cameras to generate the 3D image or the 3D animation. While generating the 3D animation, key frames are selected for reducing processing time, and depths of unselected frames between the key frames are calculated by using interpolation.

28 Claims, 9 Drawing Sheets

3D IMAGE GENERATING METHOD, 3D ANIMATION GENERATING METHOD, AND BOTH 3D IMAGE GENERATING MODULE AND 3D ANIMATION GENERATING MODULE THEREOF

BACKGROUND OF THE INVENTION

1. Field of the Invention

The present invention discloses a 3D Image generating method, a 3D animation generating method, and both a 3D image generating module and a 3D animation generating module thereof, more particularly, to a 3D image generating method and a 3D animation generating method using a depth map and both a 3D image generating module and a 3D animation generating module thereof.

2. Description of the Prior Art

With growth of 3D display technologies, people start enjoying watching 3D images and 3D animations. However, there are still many existing popular 2D images and 2D animations that cannot be enjoyed in 3D manner. If these existing 2D images and 2D animations can be turned into 3D images and 3D animations so that people can enjoy watching them in 3D manner, it would bring much pleasure to people who are interested in the existing popular 2D images and 2D animations.

SUMMARY OF THE INVENTION

The claimed invention discloses a 3D image generating method. The method comprises estimating depths of a 2D image to generate a 2D depth map having estimated depths; correcting the estimated depths of the 2D depth map to generate a corrected 2D depth map; creating a 3D model by connecting lines between pixels on the corrected 2D depth map having a depth difference smaller than a lower bound depth difference; determining at least one location; virtually positioning at least one virtual camera at the at least one location; and virtually recording the 3D model using the at least one virtual camera virtually positioned at the at least one location to generate a 3D image.

The claimed invention discloses a 3D animation generating method. The method comprises selecting a plurality of frames from a 2D animation according to average pixel differences each being an average pixel difference between two frames of the 2D animation; estimating depths of each selected frame to generate a 2D depth map having estimated depths; correcting the estimated depths of the 2D depth map to generate a corrected 2D depth map, by merging blocks neighboring to a marked figure line on the 2D depth map; generating a 2D depth map for each unselected frame according to two corrected 2D depth maps corresponding to two selected frames next to the unselected frame through interpolation; creating a 3D model by connecting lines between pixels on the corrected 2D depth map and by connecting lines between pixels on the 2D depth map of the unselected frame, the pixels on the corrected 2D depth map having a depth difference smaller than a lower bound depth difference, the pixels on the 2D depth map of the unselected frame having a depth difference smaller than the lower bound depth difference; determining at least one location; virtually positioning at least one virtual camera at the at least one location; and virtually recording the 3D model using the at least one virtual camera virtually positioned at the at least one location to generate a 3D animation.

These and other objectives of the present invention will no doubt become obvious to those of ordinary skill in the art after reading the following detailed description of the preferred embodiment that is illustrated in the various figures and drawings.

DETAILED DESCRIPTION

The present invention discloses a 3D image generating method and a 3D animation generating method. The 3D image generating method includes steps as (a1) depth estimation; (a2) depth correction; (a3) 3D model creation; and (a4) intelligent view. The 3D animation method includes steps as (b1) key frame selection; (b2) depth estimation; (b3) depth correction; (b4) depth calculation for all frames; (b5) 3D model creation; and (b6) intelligent view.

Figure 1:
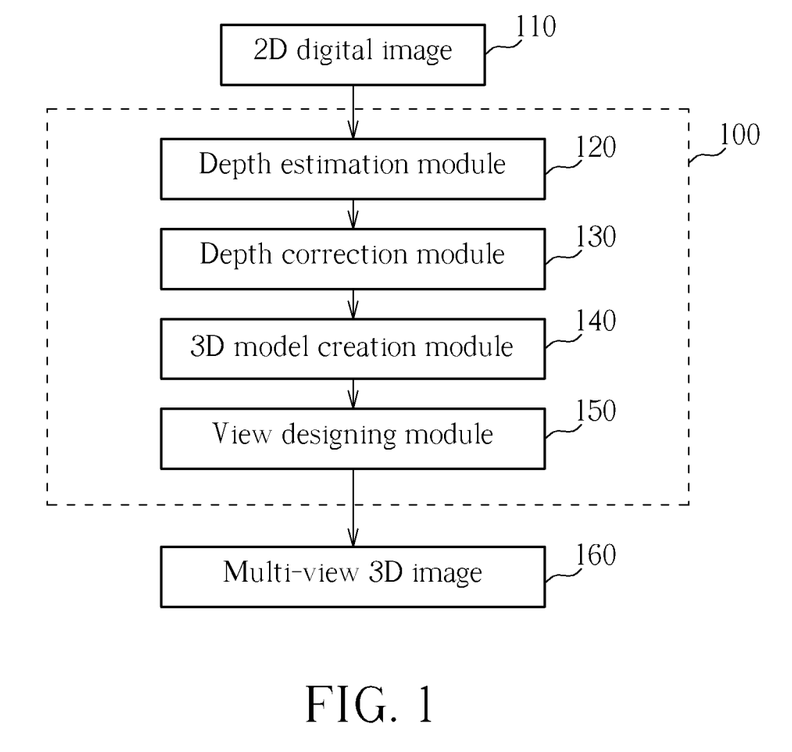
FIG. 1 illustrates a 3D image generating module according to an embodiment of the present invention.

Please refer to FIG. 1, which illustrates a 3D image generating module 100 according to the steps (a1)-(a4) and an embodiment of the present invention. As shown in FIG. 1, the 3D image generating module 100 is utilized for transforming a 2D digital image 110 into a multi-view 3D image 160, and the 3D image generating module 100 includes a depth estimation module 120, a depth correction module 130, a 3D model creation module 140, and a view designing module 150.

The 3D image generating method of the present invention is first disclosed as follows.

(a1) Depth Estimation

The purpose of the depth estimation is to establish a depth map, which records estimated depths of image blocks on the 2D image, and said depth estimation is run by the depth estimation module 120 shown in FIG. 1 for generating a depth map including a plurality of estimated depths.

The depth map is established according to factors including coverage between objects, relative sizes of objects, texture gradients, line transparency, air transparency, and object recognition.

The coverage between objects indicates distances of objects from the camera. An object closer to the camera covers another overlapping object having a longer distance from the camera.

The relative sizes of objects also indicate distances of objects from the camera. An object having a larger relative size in the 2D image or 2D animation is closer to the camera than an object having a smaller relative size.

The texture gradients indicate the density of filmed physical objects on a unit area of the 2D image. While objects in a unit area on the 2D image are farer from the camera, the texture gradient corresponding to the unit area is higher.

An object acquires more concentration lines on a 2D image while the object is farer away from the object. The property is utilized for determining the depth of the object and is called line transparency.

While an object on a 2D image is farer from the camera, the object is getting blurred in color, shape, and details, because of light scattering through the airs. The property is also utilized for determining the depth of the object and is called air transparency.

While an observer watches a scene, certain specific and familiar objects are easily recognized with growing experiences, where the scene may indicate the sky, the land, buildings, or plants. It indicates the fact that a human being may determine a reasonable location for certain objects he or she observes. In the present invention, the knowledge to recognize certain common objects is established in a database, and is utilized for establishing depths of the objects on a 2D image. This property is called object recognition.

With the aid of the above-mentioned factors, estimated depths on units of the image may be roughly established; however, there is still inaccuracy in the established depth map so that depths are required to be corrected, as described in the following step (a2).

(a2) Depth Correction

Figure 2:
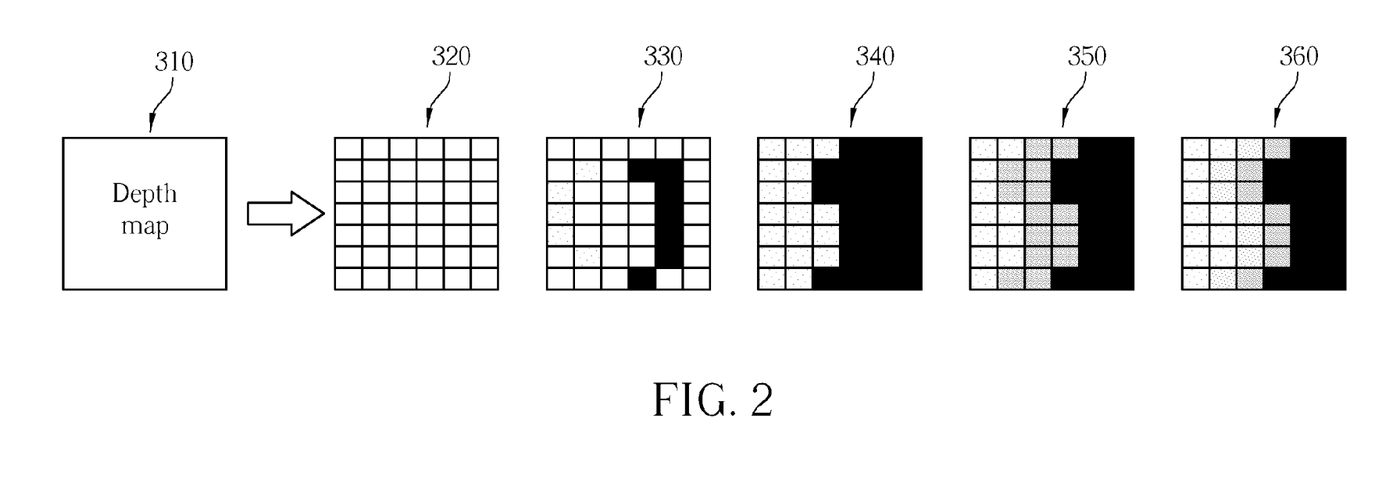
FIG. 2 illustrates the depth correction method performed by the depth correction module shown in FIG. 1.

Please refer to FIG. 2, which illustrates the depth correction method performed by the depth correction module 130 shown in FIG. 1.

A first depth map 310 is assumed to be generated by the depth estimation module 120 according to the step (a1).

First, the first depth map 310 is segmented into a plurality of blocks according to the Mean-shift algorithm, so as to generate a second depth map 320, in which different objects are segmented into different blocks as well, where one segmented block is guaranteed to indicate an unique object by using a sufficiently-small block size.

Second, a user is presumed to draw at least one figure line for indicating objects on the 2D digital image 110, and the depth correction module 130 marks the second depth map 320 according to the figure lines, so as to generate a third depth map 330, where certain exemplary italic-line-marked blocks on the third depth map 330 are marked by following the drawn figure lines.

Figure 3:
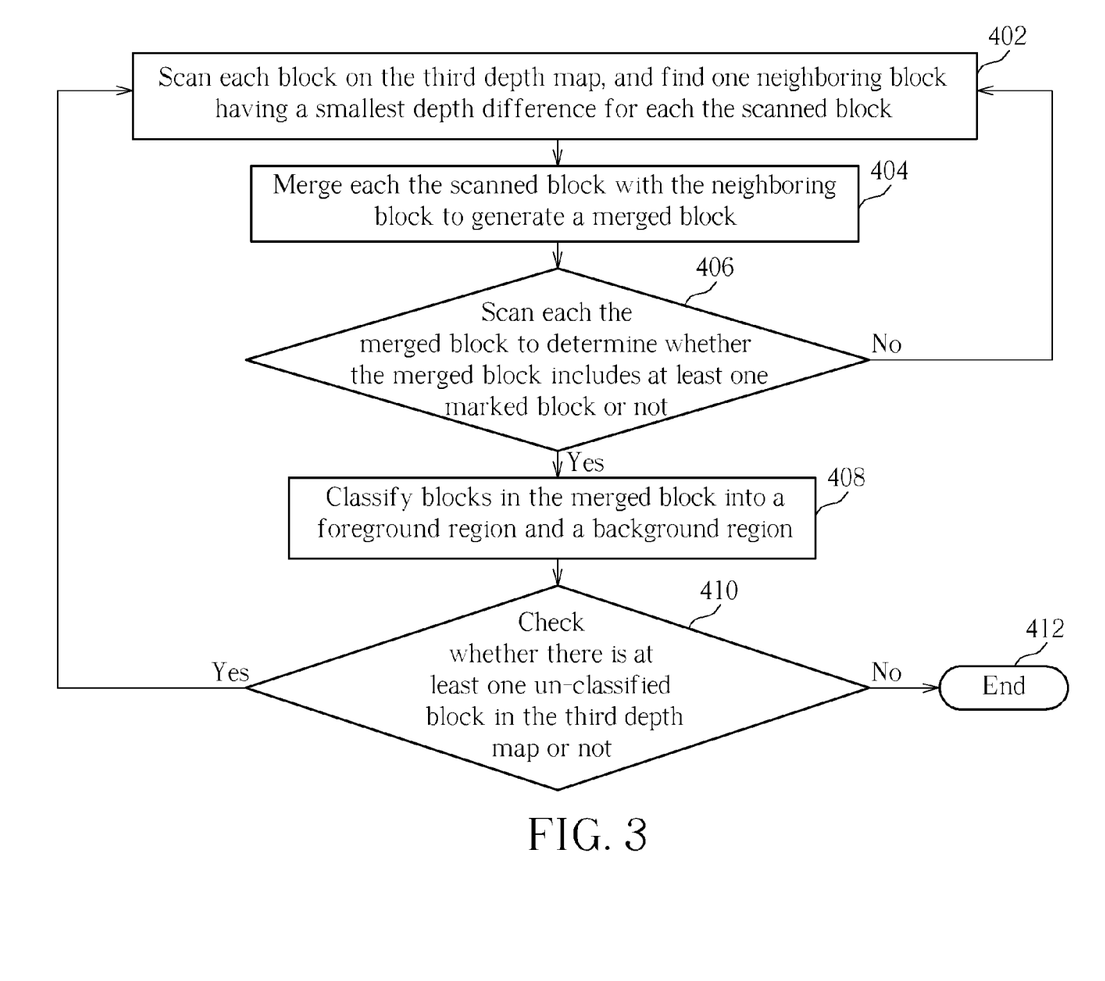
FIG. 3 illustrates a block merging procedure performed by the depth correction module.

Third, the plurality of blocks on the third depth map 330 is classified by merging, so as to generate a fourth depth map 340. Please refer to FIG. 3, which illustrates a block merging procedure performed by the depth correction module 130. The block merging procedure includes steps as follows:

Step 402: Scan each block on the third depth map 330, and find one neighboring block having a smallest depth difference for each the scanned block;

Step 404: Merge each the scanned block with the neighboring block found in Step 402 to generate a merged block;

Step 406: Scan each the merged block to determine whether the merged block includes at least one marked block or not; if there are at least one marked block found in the merged block, go to Step 408; else, go to Step 402;

Step 408: Classify blocks in the merged block into a foreground region and a background region;

Step 410: Check whether there is at least one un-classified block in the third depth map 330 or not; if there is at least one un-classified block in the third depth map 330, go to Step 402; else, go to Step 412; and Step 412: End of the block merging procedure.

The primary purpose of Steps 402-412 is to identify an object surrounded or covered by the marked figure lines, since depths on an object are likely to acquire a high depth difference with surroundings of the object. The secondary purpose of Step 402-412 is to tell the foreground of the identified object from its background, where said foreground and said background are separated by the figure line.

Steps 402-404 are configured to merge blocks indicating a same region or a same object, by utilizing the property that a same region or a same object acquires a similar depth.

Steps 406-408 are configured to classify an object surrounded by the figure lines, and to classify a foreground region and a background region with respect to the classified object.

Fourth, an edge expanding method is performed on the fourth depth map 340, so as to generate a fifth depth map 350 having clearer margins on objects. Please refer to FIG. 4, which illustrates the edge expanding method according to one embodiment of the present invention. And please also refer to FIG. 5, which illustrates an exemplary depth map to perform the edge expanding method shown in FIG. 4.

Figure 4:
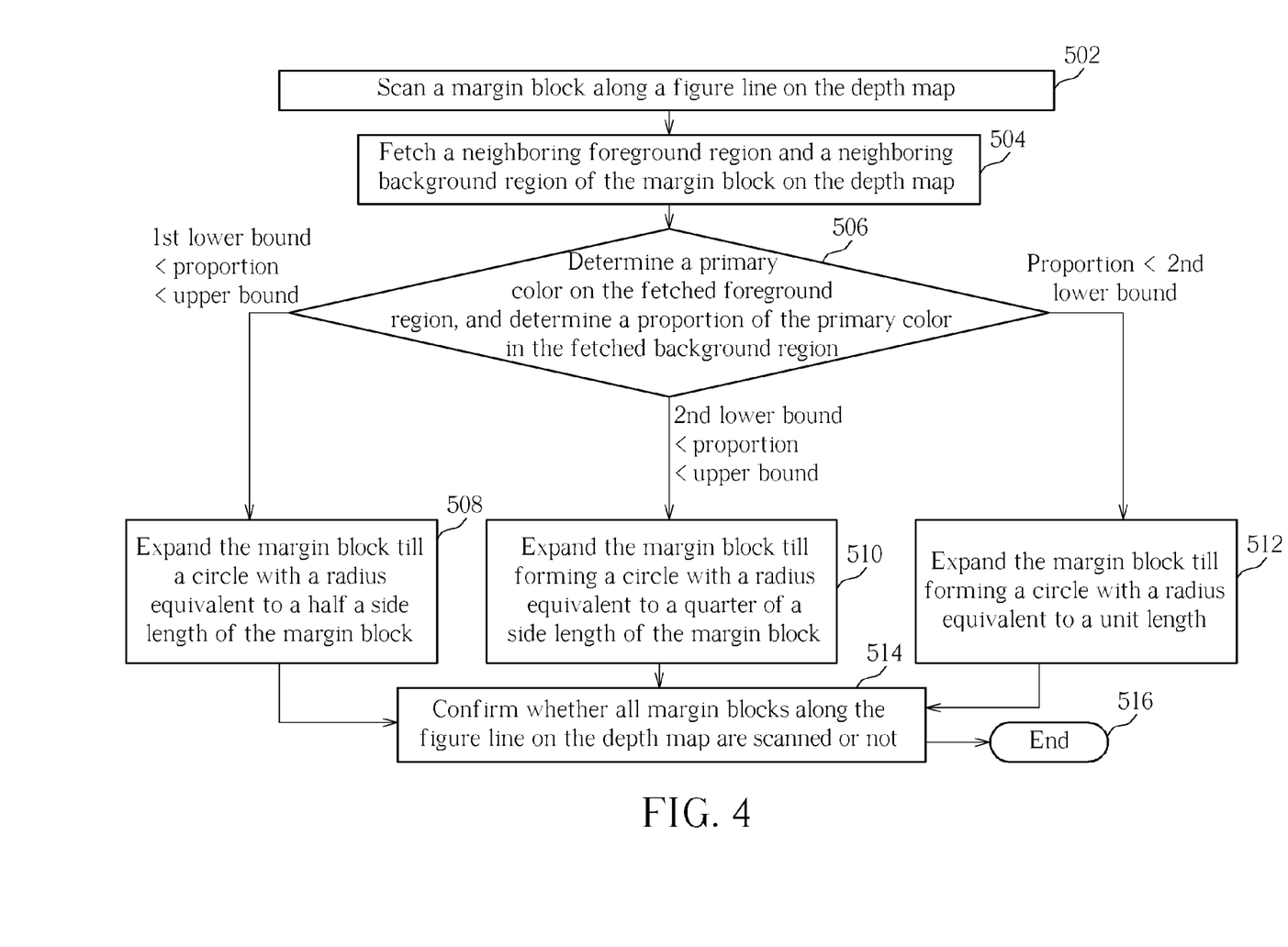
FIG. 4 illustrates the edge expanding method according to one embodiment of the present invention.

As shown in FIG. 4, the edge expanding method includes steps as follows:

Step 502: Scan a marginal block along a figure line on the depth map 340.

Step 504: Fetch a neighboring foreground region and a neighboring background region of the marginal block on the depth map 340.

Step 506: Determine a primary color on the fetched foreground region, and determine a proportion of the primary color in the fetched background region. While the proportion is between an upper bound and a first lower bound, go to Step 508; else, while the proportion is larger than a second lower bound, go to Step 510; else, go to Step 512.

Step 508: Expand the marginal block till a circle, which is centered at said marginal block and is defined with a radius equivalent to a half a side length of said marginal block, and go to Step 514.

Step 510: Expand the marginal block till forming a circle, which is centered at said marginal block and defined with a radius equivalent to a quarter of a side length of said marginal block, and go to Step 514.

Step 512: Expand the marginal block till forming a circle, which is centered at said marginal block and defined with a radius equivalent to a unit length, and go to Step 514.

Step 514: Confirm whether all marginal blocks along the figure line on the depth map 340 are scanned or not. If all the marginal blocks have been scanned, go to Step 516; else, go to Step 502.

Step 516: End of edge expansion.

Figure 5:
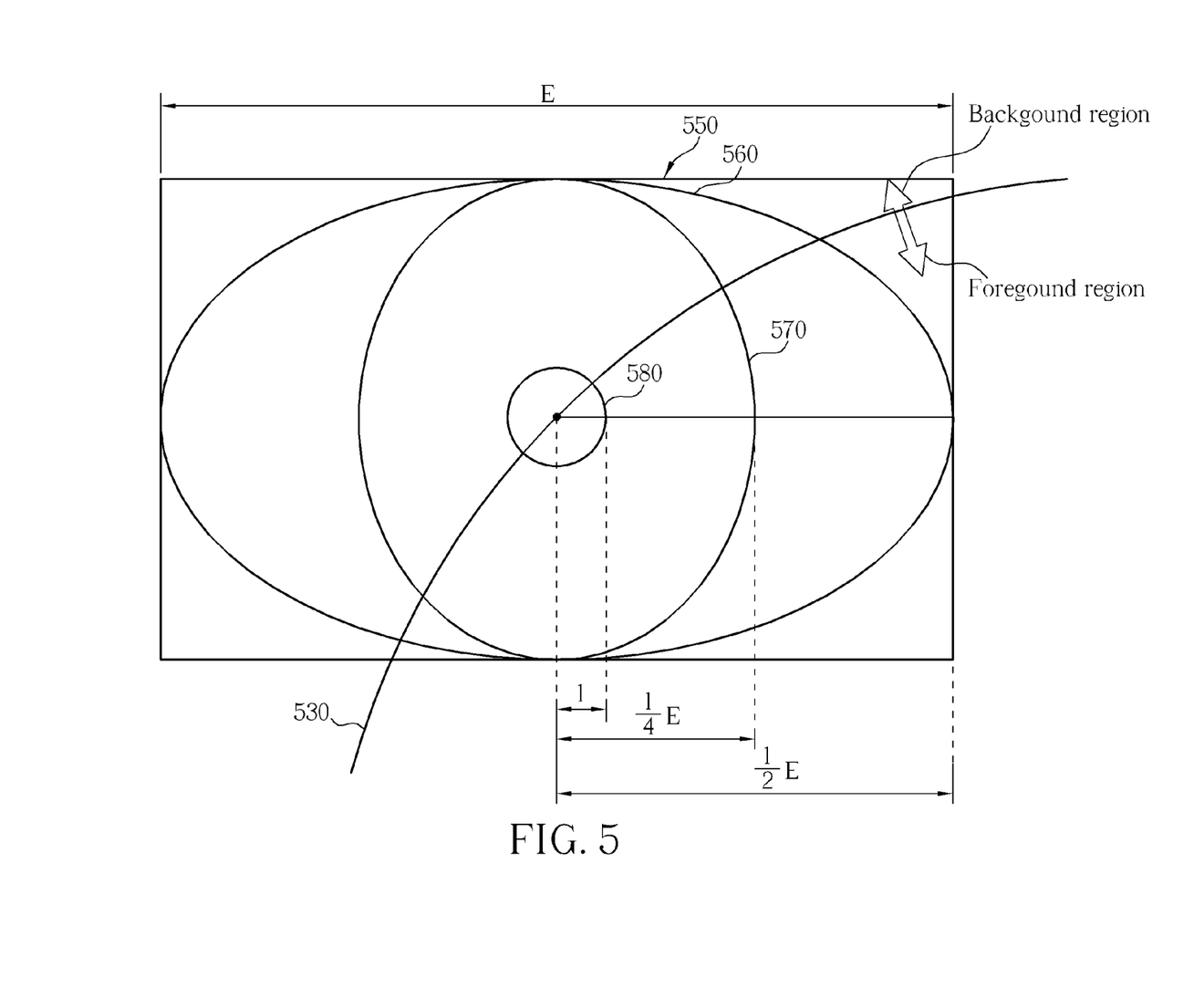
FIG. 5 illustrates an exemplary depth map to perform the edge expanding method shown in FIG. 4.

The purpose of Step 506 is to confirm the similarity in depth between the foreground region and the background region, since an edge region acquires a high similarity in depth between the foreground and the background. Therefore, in Steps 508, 510, and 512, a higher proportion of the primary color in the background indicates a higher chance that the foreground and the background indicate an edge, i.e., part of the figure line. In one embodiment of the present invention, the upper bound is 80%, the first lower bound is 30%, and the second lower bound is 10%. FIG. 5 illustrates an exemplary marginal block 550.

Last, the fifth depth map 350 is performed with edge correction based on the Bayesian Matting algorithm, i.e., recalculating depth in marginal blocks using Bayesian Matting algorithm, so as to generate a sixth depth map 360, which acquires finer edges than said fifth depth map 350 and includes a plurality of corrected depths for each pixel of the 2D digital image 110. The sixth depth map 360 also indicates an output of the depth correction module 130.

(a3) 3D Model Creation

A 3D model can be established by the 3D model creation module 140, according to the sixth depth map 360, which acquires corrected depths for each pixel on the 2D digital image 110. The 3D module creation is performed in a recursive manner.

Figure 6:
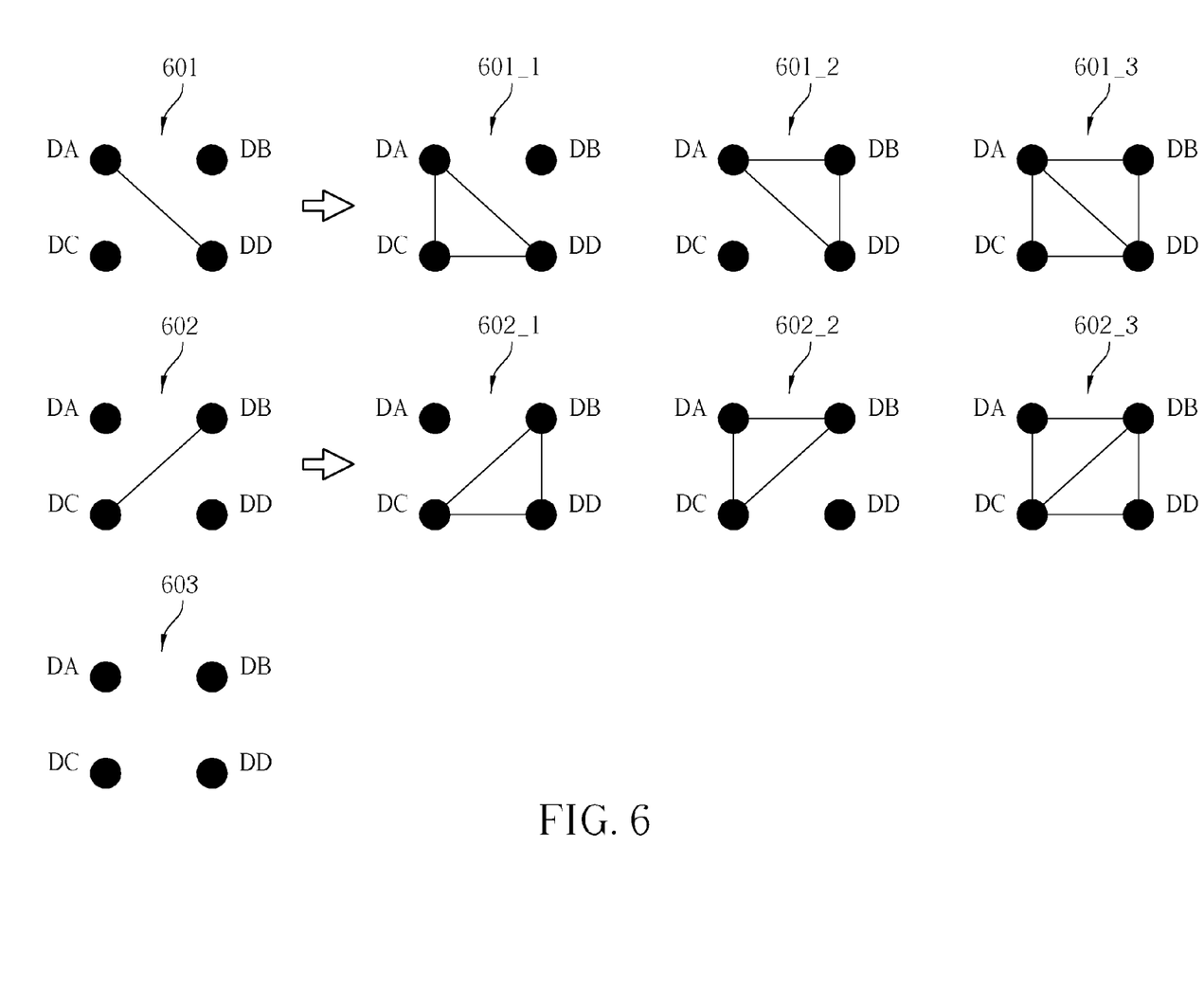
FIG. 6 illustrates the first stage of the 3D model creation procedure according to one embodiment of the present invention.

Please refer to FIG. 6, which illustrates the first stage of the 3D model creation procedure according to one embodiment of the present invention. Assume there are four neighboring pixels DA, DB, DC, and DD forming a rectangle unit to perform the recursive 3D model creation procedure, each of four neighboring pixels acquires a corrected depth, and there are two diagonals formed on the rectangle unit, i.e., a first diagonal and a second diagonal.

The 3D model creation module 140 is first configured to determine whether one diagonal of the rectangle unit can be connected, where mere one of both the first and second diagonals can be physically connected as a result; if a depth difference on the first diagonal is smaller than a lower bound depth difference and is shorter than a depth difference of the second diagonal, then the first diagonal is physically connected by the 3D model creation module 140; if the second diagonal is smaller than the lower bound depth difference and is shorter than the depth difference of the first diagonal, then the second diagonal is physically connected by the 3D model creation module 140; else, if both the first and second diagonal are larger than the lower bound depth difference, neither of the first and second diagonals are connected. A combination 601 indicates a condition that the depth difference between the pixels DA and DD is shorter than the lower bound depth and is shorter than the depth difference between the pixels DC and DB, so that the diagonal between the pixels DA and DD is physically connected. A combination 602 indicates a condition that the depth difference between the pixels DB and DC is shorter than the lower bound depth difference and is shorter than the depth difference between the pixels DA and DD, so that the diagonal between the pixels DB and DC is physically connected. A combination 603 indicates a condition that both the depth differences between the pixels DA, DD and between the pixels DB, DD are larger than the lower bound depth difference so that no diagonal is physically connected.

The 3D model creation module 140 is then configured to determine whether the edges of the rectangle unit can be connected. Similarly, if a depth difference on an edge of the rectangle unit is shorter than the lower bound depth difference, the edge is connected by the 3D model creation module 140, else, said edge is not connected. As shown in FIG. 6, combinations 601_1, 601_2, and 601_3 illustrates connected edges based on the combination 601, combinations 602_1, 602_2, and 602_3 illustrates connected edges based on the combination 602.

Figure 7:
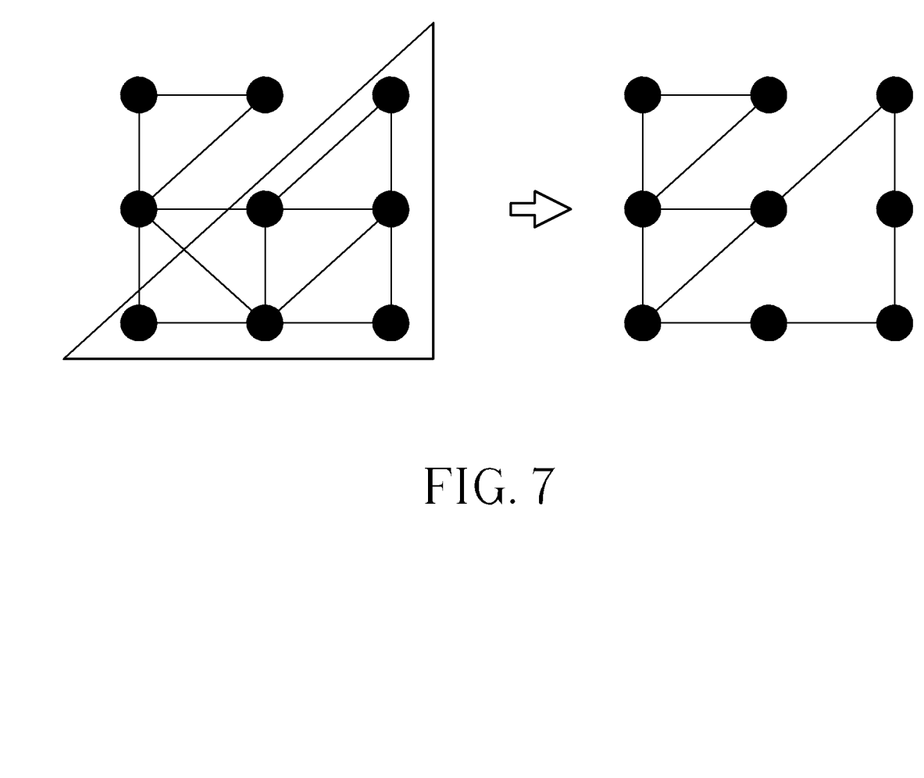
FIG. 7 illustrates how to eliminate connected lines within a connected triangle and to keep the boundary of the connected triangle.

The first recursive stage is accomplished after all the rectangle units on the depth map 360 are examined by connecting qualified diagonals and edges. As a result of the first recursive stage, as shown in FIG. 6, there are seven types of possible combinations 601_1, 601_2, 601_3, 602_1, 602_2, 602_3, and 603, and there are connected triangles and unconnected pixels in said combinations as well. In the following recursive stages, a connected triangle or an isolated pixel is served as a new unit, just like the pixels DA, DB, DC, and DD, so as to eliminate lines within a connected graph and keep the boundary of the connected graph in the depth map 360; besides, all the new units are examined by the depth differences as described above to form new combinations. For example, as shown in FIG. 7, which illustrates how to eliminate connected lines within a connected triangle and to keep the boundary of the connected triangle. The recursive 3D model creation procedure will be stopped after no further connected edges can be found or be stopped according to a command to the 3D model creation module 140. A 3D model is created after the recursive 3D model creation procedure is stopped.

(a4) Intelligent View

After the 3D model is created, multiple-time 3D images can be retrieved and generated by disposing virtual cameras in specific locations, however, the locations will directly affect the visibility in watching an outcome 3D image, i.e., the 3D image can be comfortable for an observer or not according to the location where the virtual cameras are placed.

In the present invention, some factors are utilized for determining the locations of placing virtual cameras, by the view designing module 150.

Resolution of the virtual camera is the first factor. The resolution is just the number of pixels in a unit image, such as by units of pixel per inch (PPI) or dot per inch (DDI).

A size of the 3D image, i.e., the 3D model, is the second factor. The size indicates how many pixels in the width or the height of the 3D image.

The number of placed virtual cameras is the third factor, where the 3D performance is retrieved by utilizing different views of the placed virtual cameras.

Figure 8:
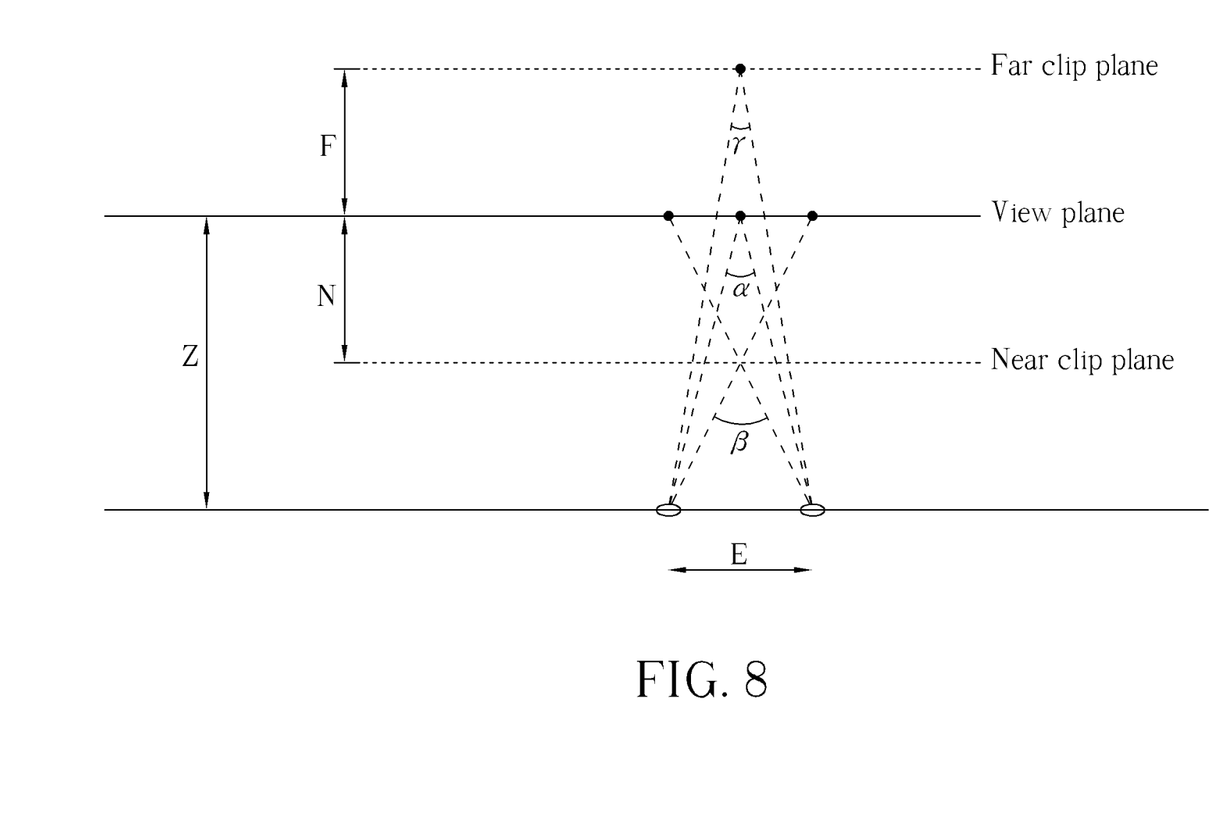
FIG. 8 illustrates a schematic diagram of determining the observing distance.

An observing distance between the observer and each of the placed virtual cameras is the fourth factor. Please refer to FIG. 8, which illustrates a schematic diagram of determining the observing distance. As shown in FIG. 8, the virtual camera is displaced on the view plane to introduce a best observing performance for an observer having an interocular distance E. F indicates a distance between the view plane and the far clip plane, N indicates a distance between the view plane and the near clip plane, and Z is just the determined observing distance between the observer and the placed virtual camera. The angles $\alpha$, $\beta$, or $\gamma$ respectively indicates a visual angle from the observer to the near clip plane, the view plane, or the far clip plane.

The observing distance Z can be determined according to the distances E, F, N and the angles $\alpha$, $\beta$, and $\gamma$, where the visual angle $\alpha$ is set to be smaller than 1° to prevent tiredness of the observer who watches the 3D image for a long duration, and the visual angle $\beta$ is set to be less than 2° to prevent overlapping vision caused by neighboring objects. Note that the visual angle $\beta$ is just the fifth factor.

After completing the steps (a1)-(a4), the 3D image, i.e., the multi-view 3D image 160, is generated and can be normally presented to an observer.

As for the 3D animation generating method of the present invention, since there are lots of 2D images in a 2D animation, the step (b2) can be performed in the same manner with the step (a1), the step (b3) can be performed in the same manner with the step (a2), the step (b5) can be performed in the same manner with the step (a3), and the step (b6) can be performed in the same manner with the step (a4). Therefore, merely the steps (b1) and (b4) are described below for brevity.

Figure 9:
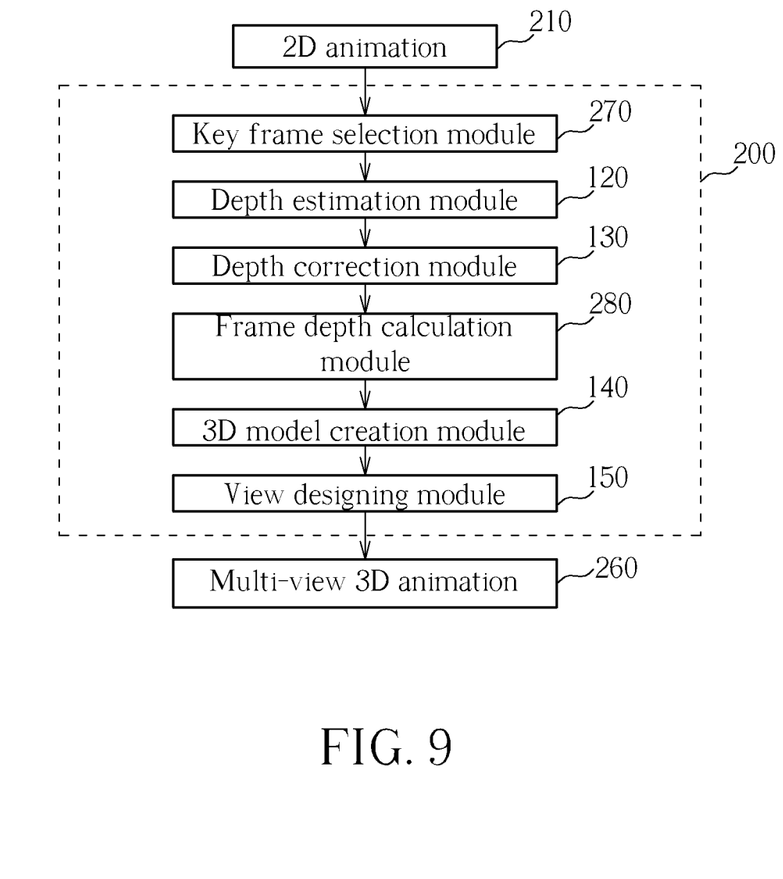
FIG. 9 illustrates a block diagram of a 3D animation generating module according to an embodiment of the present invention.

Please refer to FIG. 9, which illustrates a block diagram of a 3D animation generating module 200 according to an embodiment of the present invention. The 3D animation generating module 200 is configured to generate a multi-view 3D animation 260 according to a 2D animation 210, and includes a key frame selection module 270, the depth estimation module 120, the depth correction module 130, a frame depth calculation module 280, the 3D model creation module 140, and the view designing module 150.

(b1) Key Frame Selection

Since there are lots of 2D images, i.e., 2D frames, in a 2D animation, if all the 2D frames in the 2D animation are processed according to the 2D image generating method, there will be large and time-consuming calculations. Therefore, the key frame selection module 270 is configured to select certain key frames in the 2D animation 210 for the succeeding depth estimation, instead of calculating depths of all 2D frames in the 2D animation 210.

Key frames are selected according to two rules. In the first rule, two 2D key frames have an average pixel difference larger than a critical pixel difference, for indicating a jump between two different scenes in the 2D animation 210. In the second rule, any frame between two consecutive key frames cannot have an average pixel difference larger than the critical pixel difference with either one of both the consecutive key frames.

As a result, 2D frames between two consecutive key frames acquire similar contents and have certain similarity with either one of both the consecutive key frames. The 2D key frames selected by the key frame selection module 270 are then sent to the depth estimation module 120 for depth estimation. Processing time is also reduced by performing key selection in generating the 3D animation.

(b4) Depth Calculation for All Frames

After completing the depth correction, a selected key frame has a corrected depth map. However, for frames other than the key frames, i.e., non-key frames, their depths are also established by the frame depth calculation module 280.

Assume a non-key frame $F_i$ is located between two consecutive key frames $F_k$ and $F_{1+1}$, then depths of pixels on the non-key frame $F_i$ are calculated according to depths on both the key frames $F_k$ and $F_{k+1}$ by interpolation, as follows:

$$P_i = ((n-i)^2 \cdot I_k + i^2 \cdot I_{k+1}) / ((n-i)^2 + i^2) \quad (1)$$

$P_i$ indicates a pixel on the non-key frame $F_i$. $I_k$ indicates a pixel on the key frame $F_k$. $I_{k+1}$ indicates a pixel on the key frame $F_{k+1}$. $P_i$, $I_k$, and $I_{k+1}$ are assumed to indicate a same pixel location on respective frames. Also note that there are i 2D frames between the frames $F_i$ and $F_k$, and there are n 2D frames between the frames $F_k$ and $F_{k+1}$. As a result, the depths on the non-key frames are established for succeeding 3D model creation.

Similarly, after the steps (b1)-(b6) are completed, the multi-view 3D animation 260 can be generated and presented to the observer as a result.

The present invention discloses a 3D image generating method and a 3D animation generating method, and a 3D image generating module for implementing the disclosed 3D image generating method and a 3D animation generating module for implementing the disclosed 3D animation generating method. With the aid of the disclosed methods and modules, an existing 2D image or an existing 2D animation can be transformed into a 3D image and a 3D animation correspondingly, for the pleasure of people who are interested in the existing 2D image or the existing 2D animation.

Those skilled in the art will readily observe that numerous modifications and alterations of the device and method may be made while retaining the teachings of the invention.

What is claimed is:

1. A 3D image generating method comprising:
    estimating depths of a 2D image to generate a 2D depth map having estimated depths;
    correcting the estimated depths of the 2D depth map to generate a corrected 2D depth map, by merging blocks neighboring to a marked figure line on the 2D depth map;
    creating a 3D model by connecting lines between pixels on the corrected 2D depth map having a depth difference smaller than a lower bound depth difference; wherein creating the 3D model by connecting lines between pixels on the corrected 2D depth map comprises:
        (a) physically connecting first and second pixel sets of a first rectangular unit to form a diagonal if a depth difference of the first and second pixel sets is smaller than the lower bound depth difference and is smaller than a lower bound depth difference of third and fourth pixel sets of the first rectangular unit; and
        (b) physically connecting the first and third pixel sets, and the second and third pixel sets to form a triangle if a depth difference of the first and third pixel sets and a depth difference of the second and third pixel sets are both smaller than the lower bound depth difference;
    determining at least one location;
    virtually positioning at least one virtual camera at the at least one location; and
    virtually recording the 3D model using the at least one virtual camera virtually positioned at the at least one location to generate a 3D image.

2. The method of claim 1 wherein estimating the depths on the 2D image to generate the 2D depth map comprises:
    estimating the depths of the 2D image according to coverage between objects, relative sizes of objects, texture gradients, line transparency, air transparency, and/or object recognition.

3. The method of claim 1 wherein correcting the estimated depths of the 2D depth map to generate the corrected 2D depth map comprises:
    segmenting the 2D depth map into a plurality of blocks according to a mean-shift algorithm;
    generating the marked figure line on the 2D depth map according to a figure line drawn on the 2D image;
    merging blocks neighboring to the marked figure line to generate merged blocks and defining a foreground region and a background region for each of the merged blocks;
    expanding the marked figure line on the 2D depth map; and
    recalculating depth in a plurality of marginal blocks of the 2D depth map using Bayesian Matting algorithm.

4. The method of claim 3 wherein merging the blocks neighboring to the marked figure line to generate the merged blocks and defining the foreground region and the background region for each of the merged blocks comprises:
    scanning each block of the 2D depth map, and searching for one neighboring block having a smallest depth difference;
    merging the scanned block with the neighboring block having the smallest depth difference to generate a merged block;
    scanning the merged block to determine whether the merged block includes at least one marked block; and
    classifying blocks of the merged block into a foreground region and a background region until all blocks of the merged block are classified.

5. The method of claim 3 wherein expanding the marked figure line on the 2D depth map comprises:
    scanning at least one of the plurality of marginal blocks along the marked figure line on the 2D depth map to generate at least one scanned marginal block;
    fetching foreground regions and background regions next to the at least one scanned marginal block;

determining a primary color for each foreground region, and determining a proportion of the primary color for a background region corresponding to the foreground region; and expanding the at least one scanned marginal block according to determined proportions.

6. The method of claim 5 wherein expanding the at least one scanned marginal block according to the determined proportion comprises:

expanding the at least one scanned marginal block till a circle is formed in each merged block, the circle being centered at one of the at least one scanned marginal block of the merged block, and having a radius equivalent to half a side length of the merged block.

7. The method of claim 6 wherein the proportion is between 30% and 80%.

8. The method of claim 5 wherein expanding the at least one scanned marginal block according to the determined proportion comprises:

expanding the at least one scanned marginal block till a circle is formed in each merged block, the circle being centered at one of the at least one marginal block of the merged block, and having a radius equivalent to a quarter of a side length of the merged block.

9. The method of claim 8 wherein the proportion is between 10% and 30%.

10. The method of claim 5 wherein expanding the at least one scanned marginal blocks according to the determined proportion comprises:

expanding the at least one scanned marginal block till a circle is formed in each merged block, the circle being centered at one of the at least one scanned marginal blocks of the merged block, and having a radius equivalent to a pixel unit length.

11. The method of claim 10 wherein the proportion is below 10%.

12. The method of claim 1 wherein creating the 3D model by connecting lines between pixels on the corrected 2D depth map further comprises:

(c) eliminating connected lines and keeping a boundary of the triangle.

13. The method of claim 1 wherein determining the at least one location comprises:

determining the at least one location according to a resolution of the virtual camera, a size of the 3D model, a number of the at least one virtual camera, at least one virtual distance between the at the one virtual camera and the 3D model, and at least one virtual visual angle from the at least one virtual camera to the 3D model.

14. A 3D animation generating method comprising:

selecting a plurality of frames from a 2D animation according to average pixel differences each being an average pixel difference between two frames of the 2D animation;

estimating depths of each selected frame to generate a 2D depth map having estimated depths;

correcting the estimated depths of the 2D depth map to generate a corrected 2D depth map, by merging blocks neighboring to a marked figure line on the 2D depth map;

generating a 2D depth map for each unselected frame according to two corrected 2D depth maps corresponding to two selected frames next to the unselected frame through interpolation;

creating a 3D model by connecting lines between pixels on the corrected 2D depth map and by connecting lines between pixels on the 2D depth map of the unselected frame, the pixels on the corrected 2D depth map having a depth difference smaller than a lower bound depth difference, the pixels on the 2D depth map of the unselected frame having a depth difference smaller than the lower bound depth difference; wherein creating the 3D model by connecting lines between pixels on the corrected 2D depth map and by connecting lines between pixels on the 2D depth map of the unselected frame comprises:

(a) physically connecting first and second pixel sets of a first rectangular unit on the corrected 2D depth map or on the 2D depth map of the unselected frame to form a diagonal if a depth difference of the first and second pixel sets is smaller than the lower bound depth difference and is smaller than a lower bound depth difference of third and fourth pixel sets of the first rectangular unit; and (b) physically connecting the first and third pixel sets, and the second and third pixel sets to form a triangle if a depth difference of the first and third pixel sets and a depth difference of the second and third pixel sets are both smaller than the lower bound depth difference;

determining at least one location;

virtually positioning at least one virtual camera at the at least one location; and virtually recording the 3D model using the at least one virtual camera virtually positioned at the at least one location to generate a 3D animation.

15. The method of claim 14 wherein selecting the plurality of frames from the 2D animation according to the average pixel differences each being the average pixel difference between the two frames of the 2D animation comprising:

selecting the plurality of frames from the 2D animation while the average pixel differences is larger than a critical pixel difference, wherein any frame between two consecutive selected frames has a pixel difference smaller than the critical difference with each of the consecutive selected frames.

16. The method of claim 14 wherein estimating the depths of each the selected frame to generate the 2D depth map having estimated depths comprises:

estimating the depths of each the selected frame according to coverage between objects, relative sizes of objects, texture gradients, line transparency, air transparency, and object recognition.

17. The method of claim 14 wherein correcting the estimated depths of the 2D depth map to generate the corrected 2D depth map comprises:

segmenting the 2D depth map into a plurality of blocks according to a mean-shift algorithm;

generating the marked figure line on the 2D depth map according to a figure line drawn on the 2D image;

merging blocks neighboring to the marked figure line to generate merged blocks and defining a foreground region and a background region for each of the merged blocks; and expanding the marked figure line on the 2D depth map.

18. The method of claim 17 wherein expanding the marked figure line on the 2D depth map comprises:

scanning marginal blocks along the marked figure line on the 2D depth map;

fetching foreground regions and background regions next to the marginal blocks;

determining a primary color for each foreground region, and determining a proportion of the primary color for a background region corresponding to the foreground region; and expanding the marginal blocks according to determined proportions.

19. The method of claim 18 wherein expanding the marginal blocks according to the determined proportion comprises:

expanding the marginal blocks till a circle is formed in each merged block, the circle being centered at one of marginal blocks of the merged block, and having a radius equivalent to half a side length of the merged block.

20. The method of claim 19 wherein the proportion is between 30% and 80%.

21. The method of claim 18 wherein expanding the marginal blocks according to the determined proportion comprises:

expanding the marginal blocks till a circle is formed in each merged block, the circle being centered at one of marginal blocks of the merged block, and having a radius equivalent to a quarter of a side length of the merged block.

22. The method of claim 21 wherein the proportion is between 10% and 30%.

23. The method of claim 18 wherein expanding the marginal blocks according to the determined proportion comprises:

expanding the marginal blocks till a circle is formed in each merged block, the circle being centered at one of marginal blocks of the merged block, and having a radius equivalent to a pixel unit length.

24. The method of claim 23 wherein the proportion is below 10%.

25. The method of claim 17 wherein merging the blocks neighboring to the marked figure line to generate the merged blocks and defining the foreground region and the background region for each of the merged blocks comprises:

scanning each block of the 2D depth map, and searching for one neighboring block having a smallest depth difference;

merging the scanned block with the neighboring block having the smallest depth difference to generate a merged block;

scanning the merged block to determine whether the merged block includes at least one marked block; and classifying blocks of the merged block into a foreground region and a background region until all blocks of the merged block are classified.

26. The method of claim 14 wherein generating the 2D depth map for each unselected frame according to both the corrected 2D depth maps corresponding to both the selected frames next to the unselected frame through interpolation comprises:

determining a depth of a first pixel on the 2D depth map for each the unselected frame according to:

$$P_i = ((n-i)^2 \cdot I_k + i^2 \cdot I_{k+1})/((n-i)^2 + i^2)$$

wherein $P_i$ indicates the first pixel; $I_k$ indicates a second pixel on a first one of the key frames; $I_{k+1}$ indicates a third pixel on a second one of the key frames; the first, second, and third pixels indicate a same pixel location on respective frames; i indicates an amount of frames between the first frame and the non-key frame; and n indicates an amount of frames between the first and second key frames.

27. The method of claim 14 wherein creating the 3D model by connecting lines between pixels on the corrected 2D depth map and by connecting lines between pixels on the 2D depth map of the unselected frame further comprises:

(c) eliminating connected lines and keeping a boundary of the triangle.

28. The method of claim 14 wherein determining the at least one location comprises:

determining the at least one location according to a resolution of the virtual camera, a size of the 3D model, a number of the at least one virtual camera, at least one virtual distance between the at the one virtual camera and the 3D model, and at least one virtual visual angle from the at least one virtual camera to the 3D model.

* * * * *